United States Patent [19]
Bottomley et al.

[11] Patent Number: 5,780,167
[45] Date of Patent: Jul. 14, 1998

[54] MAGNETIC RECORDING MEDIUM HAVING A BINDER COMPRISING A STAR BLOCK POLYMER WITH DISPERSING GROUPS

[75] Inventors: William E. Bottomley, Great Dunmow, England; Colin F. Norman, Austin, Tex.

[73] Assignee: Imation Corp., Oakdale, Minn.

[21] Appl. No.: 741,753

[22] Filed: Nov. 5, 1996

[30] Foreign Application Priority Data

Dec. 4, 1995 [GB] United Kingdom .......... 9524760

[51] Int. Cl.$^6$ .................................................. G11B 5/702
[52] U.S. Cl. .................. 428/521; 428/523; 428/694 BG; 428/900
[58] Field of Search ................... 428/521, 523, 428/694 BG, 900

[56] References Cited

U.S. PATENT DOCUMENTS

| | | | |
|---|---|---|---|
| 3,280,084 | 10/1966 | Zelinski et al. | 260/83.7 |
| 3,985,830 | 10/1976 | Fetters et al. | 260/880 |
| 4,520,079 | 5/1985 | Nakajima et al. | 428/694 |
| 4,780,367 | 10/1988 | Lau et al. | 428/355 |
| 5,013,602 | 5/1991 | Yamazaki et al. | 428/323 |
| 5,128,215 | 7/1992 | Pendergrass, Jr. | 428/694 |
| 5,320,914 | 6/1994 | Nakamura et al. | 428/694 B |

FOREIGN PATENT DOCUMENTS

| | | |
|---|---|---|
| 985614 | 3/1965 | United Kingdom . |
| WO 90/14662 | 11/1990 | WIPO . |
| WO 93/01592 | 1/1993 | WIPO . |
| WO 93/16466 | 8/1993 | WIPO . |

*Primary Examiner*—Stevan A. Resan
*Attorney, Agent, or Firm*—Eric D. Levinson

[57] ABSTRACT

A magnetic recording medium comprising a substrate having a surface bearing a magnetizable coating wherein said magnetizable coating comprises a magnetic pigment dispersed in a polymeric binder, said polymer binder comprises a star block copolymer having a two phase morphology and comprising a pendant dispersing group.

12 Claims, No Drawings

MAGNETIC RECORDING MEDIUM HAVING A BINDER COMPRISING A STAR BLOCK POLYMER WITH DISPERSING GROUPS

FIELD OF THE INVENTION

This invention relates to magnetic recording media and in particular to the use of star block copolymers of defined formula as binders for such media, the star block copolymers having pendant dispersing groups.

BACKGROUND TO THE INVENTION

Magnetic recording is the preferred method of information storage when data must be capable of being read immediately after writing or where the data is to be processed by a machine. The recording medium usually consists of fine, magnetizable particles which are dispersed in a polymeric binder and coated onto a support. In order to work efficiently, magnetic media must possess certain physical and magnetic properties, e.g., the medium surface must be sufficiently smooth to enable accurate reading of the recorded signal by the magnetic head. It must also be free from asperities and other surface roughness that can lower the signal to noise ratio. In addition, the medium must be durable, so that it is possible to record and reproduce information repeatedly. To be durable, the magnetic particles must be firmly bound to the support and not be worn off by the passing of the magnetic head over the media. This durability must persist under all environmental conditions under which the medium is to be used. In addition, it is important that the media have sufficient lubricity so that the magnetic head passes freely over the surface with the minimum coefficient of friction. Furthermore, the medium should have uniform physical properties over a wide temperature range.

Magnetic recording media are normally produced by passing a non-magnetic support through an apparatus which coats the support with a liquid dispersion of the magnetic medium. This dispersion consists of a binder, in either an uncured or solvated state, having the magnetizable particles homogeneously dispersed therein. After coating, the dispersion dries or cures to give a tough binder film having the magnetizable particles uniformly distributed throughout. The desired physical and magnetic properties of the recording layer are often dictated by certain processing parameters. One important parameter is good pigment wetting in the bulk liquid dispersion. Good pigment wetting is closely related to dispersion stability and is essential to ensure an even distribution of pigment throughout the finished magnetic coating.

Of the various resin materials utilised for magnetic media applications, the most commonly used are polyurethane resins, vinyl chloride—vinyl acetate copolymers and nitrocellulose and the like. These binder materials are not able to efficiently wet the pigment surface, and so cannot disperse the magnetic particles sufficiently well to enable a medium to be produced with homogeneously dispersed magnetic particles. In such systems it is conventional to add a lower molecular weight dispersing agent such as a soy-bean lecithin or a phosphoric acid derivative to aid in pigment dispersion.

Magnetic media containing low molecular weight dispersing agents are prone to interactions which can adversely affect its performance. When such a system is used over a long period of time bleeding of the dispersant can occur which will be detrimental to the durability and runnability of the media. In addition, the current trend is to use media which have high pigment loadings (typically greater than 75% by weight, and often as high as 85%), of fine (i.e., high surface area) pigments. Such media would require high levels of dispersant and consequently proportionally lower levels of the organic components (i.e., binders). This will have an adverse effect on the physical properties of the media.

In order to overcome such problems, binders having dispersing capacity have been developed. In particular, polar groups, such as, hydroxyl, carboxyl, sulphonic acid, phosphoric acid and the like have been introduced to improve the binder's affinity towards the magnetic pigment.

The use of binders containing polar groups for dispersing, herein called self-dispersing binders, has been explored with a number of binder types, typically found in magnetic media formulations. For example, self-dispersing polyurethanes and vinyl chloride containing binders have been used in recent years in order to improve magnetic media performance.

In addition to the need for high quality, stable dispersions, the coated dispersion paint must be hardened during the drying process. Most conventional magnetic media rely on a chemical reaction between a polyfunctional isocyanate crosslinking agent and hydroxy functionality present on the binder material(s). This chemical reaction effectively cures the coating and so toughens it. The isocyanate is generally added to the dispersion prior to coating (known as the activation step) and consequently the dispersion has a finite pot-life. If this cure reaction is too slow, the magnetic coating will have poor green strength until the cure reaction has progressed sufficiently. As a result, the magnetic coating will be susceptible to damage during subsequent processing steps unless an inconvenient and expensive time delay is built into the manufacturing process.

The bulk of binder materials used in the preparation of conventional media are of relatively low molecular weight. Consequently, a cure reaction is essential to produce media having the appropriate mechanical properties. A further problem inherent in this approach arises from the very presence of these low molecular weight species. If for any reason the cure reaction is incomplete, then low molecular weight species can remain in the coated media following the cure step. The presence of such species can plasticize the media leading to poor media durability. Furthermore, these low molecular weight species, whilst remaining mobile in the coating, may migrate to the surface of the media and therefore come into contact with the recording head. This could adversely affect performance through increased friction, stiction, head clogging and/or poor blocking resistance.

Another problem encountered with conventional binder systems is the degradation of the binder material through hydrolysis or oxidation. This leads to an increase in the amount of low molecular weight species in the binder matrix and hence to the occurrence of such problems described above.

In addition to environmental degradation, the affect of heat on the physical properties of magnetic media coatings can also be detrimental to the performance of the media. Many known polymeric binder systems exhibit a change in physical properties over a wide range of temperatures. This change is caused by the glass-transition temperature (Tg) of the chosen binder material(s) falling within the temperature range in which the media is to be used. Often, the Tg temperature is in the range 50°–70° C., with the lower temperatures in this range perilously close to that of potential hot storage areas, e.g., under sun-light and glass. In an extreme case, the binder system can change from a stiff, reasonably brittle material at low temperatures, to a soft, tacky material as the temperature is increased. Such changes in physical properties can cause critical performance problems during usage.

WO90/14662 and U.S. Pat. No. 5,128,215 disclose an improved magnetic recording medium comprising a magnetizable pigment dispersed in styrene-diene block copolymer of the formula A—B—Y—(B—A)$_n$, where Y is a single bond or multifunctional coupling agent, n=1–15, A is a styrene hard polymeric segment of Tg above 70° C. and B is a conjugated diene derived soft segment having a Tg of less than –30° C.

WO93/01592 discloses a star block copolymer material, utilised as a magnetic media binder material. The term "star" describes the structure of a multi-arm polymer with copolymer arms which are joined together at a nucleus formed by a coupling moiety or linking agent which is effectively a point relative to the overall size of the remainder of the polymer structure. Each arm contains one or more blocks of a hard, non-elastomeric polymer which is/are bonded to one or more blocks of a soft elastomeric polymer. Depending on the relative content of the hard and soft blocks in the copolymer, the overall polymer will exhibit elastomeric or non-elastomeric properties.

There is a need to provide a binder suitable for use in magnetic media which is comprised of high molecular weight starting materials and which does not require polymerisation or crosslinking to form a suitable magnetic coating. In addition, it is highly desirable that these high molecular weight binder materials provide good pigment wetting and dispersion stability.

BRIEF SUMMARY OF THE INVENTION

In a first aspect of the invention, there is provided a magnetic recording medium comprising a magnetizable coating provided on a substrate wherein the magnetizable coating comprises a magnetic pigment dispersed in a polymeric binder, the polymer binder comprises a star block copolymer having a two phase morphology and the block copolymer comprises a pendant dispersing group.

The star block copolymers described herein are of the same class of materials as disclosed in WO93/01592, except they contain dispersing groups distributed along the polymer arms.

The copolymer material of the present application contains a polar dispersing functionality which provides for excellent pigment wetting and ultimately, good dispersion stability. The use of this binder in magnetic media formulations removes the need to add low molecular weight dispersing agents.

These materials are suitable for use with a wide range of pigment types such as iron oxides, cobalt doped iron oxides, metal particle and barium hexa-ferrite pigments.

DESCRIPTION OF PREFERRED EMBODIMENTS

The magnetic recording medium contains a polymeric binder, which is a star block copolymer of the general formula:

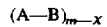

in which

X represents a polyfunctional coupling moiety and each (A-B) represents a polymeric arm radiating from the polyfunctional coupling moiety X, m has a number average value of at least 3, preferably between 4–10 and most preferably 5–8.

A represents a hard, glassy polymeric segment and B represents a soft, rubbery polymeric segment. The hard, glassy polymeric segment is incompatible with the soft, rubbery polymeric segment. Each arm (A-B) may comprise one or more hard, glassy segments and one or more soft segments. The hard, glassy polymeric segments comprise at least 50% of the total weight of the copolymer, and the free ends of the arms (A-B) must comprise hard, glassy polymeric segments.

In addition, the hard, glassy segments A and/or the soft, rubbery segments B must comprise (on average) at least one pendant dispersing group. Examples of dispersing groups include polar wetting groups such as sulphonic, phosphoric, phosphonic and carboxylic acid (and salts thereof), phosphonate esters, tertiary amines and quaternary ammonium salts.

In preferred embodiments, the hard, glassy segments A comprise polystyrene chains, the soft, rubbery segments B comprise polyisoprene or polybutadiene chains, the coupling moiety X is derived from divinylbenzene (DVB), and pendant quaternary ammonium dispersing groups are attached to the hard, glassy segments A.

The synthesis of star block copolymers is described in detail in WO93/01592, incorporated herein by reference, and may be modified or extended to provide pendant dispersing groups as described hereinafter.

The star block copolymers of general formula (I) can be tailored to provide uniform physical properties over a wide temperature range by careful selection of the hard, glassy polymeric segment (A) and the soft, rubbery polymeric segment (B). By choosing A having a relatively high glass transition temperature and B having a relatively low glass transition temperature, the resulting star block copolymer will show uniform physical properties between the glass transition temperatures. For example, if A has a glass transition temperature of at least 75° C. and B has a glass transition temperature of no more than 25° C., the resulting star block copolymers would show uniform physical properties in an approximate temperature range from 25° C. to 75° C.

Furthermore, star block copolymers of formula (I) may be readily synthesized by anionic methods of polymerization. Advantageously, the anionic method of polymerization allows the polydispersity (of the molecular weight distribution) of the star block copolymers to be reduced to less than 1.5, preferably to 1.2 or less. Consequently, the amount of low molecular weight species present in the binder is substantially reduced, thereby alleviating the problem of head contamination by such species.

Each arm (A-B) comprises one or more hard, glassy polymeric segments represented by A and one or more soft, rubbery polymeric segments represented by B, with the free end (i.e., the end not bonded to X) comprising a hard, glassy polymeric segment (A). Preferably each arm (A-B) consists of an outer hard, glassy polymeric segment (A) bonded directly to an inner soft, rubbery polymeric segment (B), which in turn is bonded to the polyfunctional coupling moiety. The weight average molecular weight of (A-B) as a representative measure of arm length is generally greater than 50×10³ to allow for steric interaction between adjacent copolymer molecules. Such steric interaction imparts mechanical strength to the media without the need for an additional crosslinking step. The weight average molecular weight of (A-B) is usually no greater than 100,000 so that solutions of the block copolymer do not become too viscous.

Too high a viscosity inhibits both copolymer synthesis and its subsequent formulation as a binder. Preferably, the weight average molecular weight of (A–B) is from $50 \times 10^3$ to $80 \times 10^3$ and more preferably $55 \times 10^3$ to $75 \times 10^3$.

The hard, glassy polymeric segment (A) may comprise any suitable polymer, whether a homopolymer or a copolymer, known in the art. Preferably, the hard glassy polymeric segment (A) comprises a polymer having a glass transition temperature (Tg) of at least 75° C. and more preferably at least 85° C. Generally the hard glassy polymeric segment comprises a homopolymer of a monoalkenyl aromatic monomer, preferably a monovinyl aromatic monomer. Examples of suitable monovinyl aromatic monomers include styrene and derivatives thereof such as 3-methylstyrene, 4-methylstyrene, 4-isopropylstyrene, 2-ethyl-4-benzylstyrene, 4-p-tolylstyrene, 4-(4-phenyl-nbutyl)styrene, 2,4-dimethylstyrene, 2,4,6-trimethylstyrene, 3-methyl-5-n-hexylstyrene, 1-vinylnaphthalene, 2-vinylnaphthalene and alkyl, cycloalkyl, aryl, alkaryl or aralkyl derivatives of vinylnaphthalene. The monovinyl aromatic monomers may be employed individually or as mixtures with one another. Preferably the monovinyl aromatic monomer is styrene used alone.

The hard, glassy polymeric segment (A) comprises at least 50% by weight of the block copolymer and usually no more than 85% by weight of the block copolymer to avoid the media becoming too inflexible. The polyfunctional coupling moiety (X) is present in such small amounts relative to the total weight of the star block copolymer that its presence is relatively inconsequential when compared to the weight of the other polymeric components. Thus, the polyfunctional coupling moiety (X) is deemed by convention to be of negligible weight when calculating the weight percent of the polymeric components represented by A and B. Preferably, the hard, glassy polymeric segment comprises from 55 to 75% and more preferably 65 to 75% by weight of the block copolymer.

The soft, rubbery polymeric segment (B) may comprise any suitable polymer, whether a homopolymer or copolymer, known in the art which is incompatible with the polymer of the hard, glassy polymeric segment (A). Two polymers are said to be incompatible if a blend of the polymers shows a two-phase morphology. This may be detected by a variety of means, including microscopic examination of thin sections, but it is most commonly deduced from the presence of two separate glass transition temperatures for the blend of the polymers. Preferably, the soft, rubbery polymeric segment comprises a polymer having a glass-transition temperature (Tg) no greater than 25° C., more preferably no greater than 0° C., and most preferably no greater than –10° C. Preferably, the soft, rubbery polymeric segment (B) comprises a homopolymer of a conjugated diene, generally comprising from 4 to about 14, preferably 4 to 10, carbon atoms.

Examples of suitable conjugated dienes include 1,3-butadiene, 2-methyl-1,3-butadiene(isoprene), 2,3-dimethyl-1,3-butadiene, 1-phenyl-1,3-butadiene, 1,3-pentadiene (piperylene), 1,3-hexadiene, 4-ethyl-1,3-hexadiene, 1,3-octadiene and 3-butyl-1,3-octadiene. Preferably, the conjugated diene is butadiene or isoprene used alone. Star block copolymers formed from dienes such as butadiene may be fully or partially hydrogenated using techniques known in the art to prevent unwanted or undesirable oxidation or cross-linking of the diene portions.

In a highly preferred embodiment, the star block copolymers of formula (I) comprise styrene-diene copolymers, particularly styrene-butadiene and styrene-isoprene copolymers. These block copolymers have an ordered microstructure having domains of polydiene in a matrix of the polystyrene. The sytrene content is greater than 50% by weight of the copolymer to ensure good physical properties. The maximum styrene content is usually no greater than 85% by weight of copolymer to avoid the media becoming too inflexible and rigid. Preferably, the styrene content is from 55 to 75% and more preferably 65 to 75% by weight of the copolymer.

The star block copolymers of formula (I) may be prepared by known techniques of anionic polymerization, described, for example, in U.S. Pat. No. 4,780,367. Most conveniently, one or more monomers corresponding to hard glassy segments (A) are polymerized under conditions affording a living polymer, which is then reacted with one or more monomers corresponding to soft rubbery segments B, again under conditions affording a living polymer. The resulting living linear block copolymer is then reacted with a polyfunctional coupling agent corresponding to X to form the star block copolymer.

The polymerization reaction is normally carried out in solution, typically in an inert organic hydrocarbon solvent. Suitable hydrocarbon solvents are aliphatic, cycloaliphatic and aromatic hydrocarbons which are liquid under the reaction conditions and preferably comprise 4 to 12 carbon atoms. Examples of suitable solvents are isobutane, n-pentane, isooctane, cyclopentane, cyclohexane, cycloheptane, benzene, toluene, xylenes and others. Mixtures of these solvents may also by employed. Furthermore, the polymerization can be carried out in the presence of small amounts, in general from $10^{-3}$ to 5 percent by weight (based on total solvents) of ethers, e.g., tetrahydrofuran, dimethoxyethane, phenyl methyl ether and others, whereby it is possible to influence, in the conventional manner, the rate of polymerization, the configuration of the second polymer, i.e., polymeric segment B and the statistical transition between the segments A and B.

The initiators employed are preferably the conventional monolithium-hydrocarbons of the general formula R—Li, where R is an aliphatic, cycloaliphatic, aromatic or mixed aliphatic-aromatic hydrocarbon radical, which may comprise up to about 12 carbon atoms. Examples of suitable lithium-hydrocarbon initiators are: alkyl-lithium compounds, e.g., methyl-lithium, ethyl-lithium, n-sec- and tert-butyl-lithium and isopropyl-lithium; cycloalkyl-lithium compounds, e.g., phenyl-lithium, naphthyl-lithium and p-tolyl-lithium. The monolithium-alkyl compounds where the alkyl group comprises from 2 to 6 carbon atoms are preferred, n-butyl-lithium and sec-butyl-lithium being particularly preferred.

The nature of the polyfunctional coupling moiety (X) used is not critical provided it does not significantly detract from the desired properties of the end product.

The polyfunctional coupling moiety is generally at least difunctional and, if it is of the chain terminating type, must be at least capable of reacting three or more of the active living block copolymer chains via the terminal lithiumcarbon species to form a chemical bond and the characteristic star configuration. The coupling of lithium-terminated living polymers with polyfunctional coupling moieties is known in the art and disclosed, for example, in British Patent No. 985 614.

Polyfunctional coupling moieties of the chain terminating type, suitable for the manufacture of star block copolymers of formula (I), are compounds comprising at least 3 groups capable of reacting with the terminal lithium-carbon species to form a chemical bond. Such groups include alkyl halide, silicon halide, epoxide, isocyanate, ketone, ester and acid anhydrides.

Preferred coupling agents are chain extenders, such as polyvinyl-aromatics, especially divinylbenzene and derivatives thereof, as described e.g., in U.S. Pat. No. 3,280,084. In this case, some divinylbenzene units add on, producing cross-linking and forming a branching center, through which the arms (A–B) may bond to one another, the process being one of chain extension.

In general, the polyfunctional coupling moiety if it is a chain terminator, is added to the reaction solution in amounts equivalent to the total amount of the living polymer blocks, i.e., equivalent to the number of active lithium-carbon bonds in the preformed linear block copolymers. The quantity of coupling moiety used is derived from the actual content (moles/liter basis) of active polymer chain ends in the polymerization mixture. The reaction of the living linear block copolymers with the coupling moiety is preferably carried out under the same reaction conditions as the polymerization of the monomers. The resulting branched block copolymers are isolated from the reaction solution by conventional methods e.g., by precipitating the polymer from reaction solution, and filtering it off. Alternatively, if the polymer has been synthesized in an appropriate solvent, the reaction solution may be used directly.

When a chain-extending coupling agent such as divinylbenzene is used, then a mole equivalent ratio of coupling moiety to active chain ends of 3:1 to about 20:1 or higher may be used. The preferred ratios are 4:1 to about 6:1. In the case of difunctional moieties which polymerize during the coupling reaction, such as divinyl-benzene, the amount of moiety to be used should be determined for the conditions of reaction, since the number of equivalent functional sites is variable.

The number of arms of the star block copolymer, the molecular weight and the architecture required to produce a polymer of the desired viscosity may be controlled by appropriate selection of the type and quantity of the coupling moiety. For example, in the case of divinylbenzene (DVB) as shown by Fetters et al. U.S. Pat. No. 3,985,830, at least two DVB molecules must add to the end of the copolymer chain in order for linking to occur, such that there is always at least one vinyl group left over for further reaction. In order to link a high percentage of the lithium terminated copolymer arms, a threshold amount of DVB of about two moles of DVB per mole of arms is required. However, since the linking reaction is nonterminating small amounts of DVB in excess of the threshold (e.g., 3 moles DVB/mole arms) can link together large numbers of arms. At mole ratios of DVB greater than the threshold, the stars can have, for example, on average, more than 12 arms per star with the number of arms linked being a factor of steric inhibition and charge density at the forming star nucleus.

The average number of polymeric arms is typically measured by size exclusion chromatography with low-angle laser light-scattering detection (SEC/LALLS). Light scattering (using forward scattering and laser sources) by colloidal-sized particles is related to the molecular weight of the particle. If the weight per unit volume of the particles and the relative refractive index (dn/dc) are known, then the molecular weight can be calculated. Therefore, in SEC/LALLS, the particles are separated in a column and subjected to laser light, the scattering of which yields the molecular weight of the star polymer directly. If the molecular weight of an "arm" is known (the arm is obtained by directly sampling the polymerization mixture before the DVB linking reagent is added), and the molecular weight of the linked-arm star is known, then it is a simple matter to calculate the number of arms per star molecule. The SEC/LALLS system is described by R. C. Jordan et al in "Size Exclusion Chromatography with Low-Angle Laser Light-Scattering Detection", ACS Symposium Series, No. 245, 1984.

A typical synthesis procedure is described in U.S. Pat. No. 4,780,367 (Lau et al) and comprises charging a polymerization reactor with dry cyclohexane and dry styrene monomer adding the initiator, e.g., sec-butyl lithium and allowing the styrene block (first polymeric segment) to polymerize for one hour at 60° to 65° C. Dry isoprene is then added to the reaction mixture and the second block allowed to polymerize for a minimum of 2 hours at 50° to 65° C. The block copolymer "arms" are then linked in a star structure by the addition of the coupling moiety, e.g., dry divinylbenzene (commercially available from Aldrich Chemical Co. Ltd. 55%) at 65° C. to 70° C. and maintaining the reaction mixture at this temperature overnight before cooling to room temperature and isolating to remove the polymer by conventional techniques.

The synthetic methodology described above must be modified or extended so as to provide pendant dispersing groups in one or both of the polymer segments of the star block copolymer. For example, a polymer synthesised as described above may be subjected to further chemical treatment in order to introduce dispersing group functionality. Because of the presence of reactive olefinic groups, the soft, rubbery blocks are generally more amenable to chemical modification in this way, the hard glassy blocks being comparatively inert chemically. For example, pendant carboxylic acid groups may be attached to polyisoprene or polybutadiene chains by reaction with maleic anhydride (as described in "Encyclopedia of Polymer Science and Engineering" (2nd Ed.), Vol. 9 pp 275–6 (Wiley, 1987)) followed by hydrolysis. Alternatively, dispersing groups (or precursors thereof) may be introduced at the polymerisation stage by adding appropriately-functionalised co-monomers to the polymerising mixture. In principle, such co-monomers may be added during the growth of either the hard or the soft segments, or both, but in practice it is preferable to use this strategy to introduce dispersing groups to the hard segments.

Due to the difficulty in combining what is effectively an impurity into the anionic polymerisation reaction (arm formation), the choice of suitable monomers is rather limited. One important factor instrumental in deciding on monomer choice is its reactivity compared to the main block monomer constituent, exemplified by styrene. Effectively, the monomer must be capable of being initiated by styrene and once initiated, initiating another styrene monomer in order to complete the block formation.

Another factor which ultimately dictates the choice of monomer is the polar group moiety that will be utilised as the pigment dispersing group. Due to the sensitivity of anionic polymerisation reactions to moisture and other impurities that can "quench" and halt reactions, the "dispersing monomer" must be soluble in inert solvents, i.e., cyclohexane and the like.

Preferably, styrene based monomers are used which contain precursor groups attached to the aromatic ring which may be converted to dispersing groups when polymerisation is complete. Examples of these monomers include:

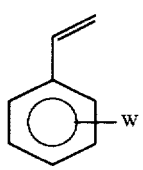

The group W is convertible to a dispersing group, and can be ortho, para or meta to the vinyl group.

W is preferably a tertiary amine group and most preferably is $(CH_2)_x NMe_2$ where $x=0, 1, 2, 3 \ldots$ Once integrated into the star block copolymer structure, the group W may be converted to the dispersing group. For example where $W=(CH_2)_x NMe_2$, the amine groups are quaternised using reagents such as dimethyl sulphate and methyl iodide.

Regardless of the manner in which the pigment dispersing groups are incorporated in the star block copolymer binders, each polymeric arm comprises (on average) at least one such group, preferably an average of from 2–10 such groups, and more preferably an average of about 5 such groups.

The magnetic recording media of the invention may be prepared using conventional techniques known in the art. A good summary of the principles of manufacturing magnetic tapes and discs may be found in "The Complete Handbook of Magnetic Recording —Chapter 13 entitled Manufacture of Magnetic Tapes and Discs" by Finn Jorgensen (3rd Edition—ISBN 0-8306-1979-8). Generally, the magnetizable particles are dispersed in a solution of the star block copolymer using conventional mixing procedures, such as kneading, planetary mixing, ball milling (both horizontal and vertical), pebble milling, sand milling, sand shaking etc., followed by filtration to remove lumps, aggregates, agglomerates and foreign matter which cannot be tolerated in the coating mix, deaeration and finally the addition of solvent to provide the desired coating viscosity.

The solvent is generally contained in the magnetic paint in an amount of from 50 to 600 parts by weight based on 100 parts by weight of the magnetizable particles. The precoating mix, or magnetic paint, prepared as described above generally contains the star block copolymer of formula (I) in an amount of from 5 to 100 parts by weight, preferably 7 to 40 parts by weight, based on 100 parts by weight of the magnetizable particles. Other binders may be contained in the magnetic paint (provided they are compatible with the star block copolymer), including linear block copolymers of the general formulae ABA or $(AB_2X$ where A, B and X are defined earlier. Such supplementary binders may comprise up to 50 parts by weight based on 100 parts by weight of the magnetizable particles.

The magnetic paint may also comprise one or more conventional additives such as lubricants; abrasives, e.g., aluminium oxide; thermal stabilizers, e.g., octadecyl-3,5-di-tert-butyl-4-hydroxyhydrocinnamate; anti-oxidants; anti-static agents, e.g., soot, graphite; fungicides, bacteriocides; surfactants; coating aids; non-magnetic pigments etc., known in the art. Such additives may comprise up to 50 parts by weight based on 100 parts by weight of the magnetizable particles.

Examples of lubricants include saturated and unsaturated fatty acids, fatty acid esters, higher fatty acid amides, higher alcohols, silicone oils, mineral oils, molybdenum disulfide, fluorinated polymers, such as perfluoro ethers, and the like.

Examples of antioxidants which may be used in the magnetic media of the present invention include salicylanilide, tin oxide, mercury phenyloctoate, copper naphthenate, zinc naphthenate, trichlorophenol, dinitrophenol, sorbic acid, butyl p-hydroxybenzoate, and the like.

Non-magnetic pigments which may be added as a head cleaning agent or for other purposes include silicon oxide, titanium oxide, aluminium oxide, chromium oxide, calcium carbonate, zinc oxide, talc, kaolin, silicon carbide, carbon black and the like.

Any of the conventional procedures known in the art may be used to cast the coating mix to form a self-supporting film serving as an integral magnetic recording element, or to coat the mix onto a suitable material to form a supported magnetic recording element. For example, direct gravure coating systems, such as offset gravure coaters and reverse roll coaters, and unnipped coating systems such as knife coaters etc., may be used to prepare the media. Spinning and spraying techniques may also be used to prepare magnetic discs.

The thickness of the coated layer is dependent on the nature of the recording element but generally for tapes, cards and discs, the thickness of the layer would typically be from 0.5 to 50 µm, preferably 1.0 to 20 µm and more preferably 1.5 to 10 µm.

Suitable base materials for supported magnetic recording elements are known in the art and typically comprise a non-magnetic support. For tapes and flexible discs, suitable base materials include poly(ethylene terephthalate), commercially available under the trade name Mylar, poly(ethylene-2,6-naphthalate), poly(ethylene), poly(propylene), polycarbonates, polyamides, poly(vinyl chloride), cellulose acetate, cellulose triacetate etc. For hard discs, suitable base materials include aluminium. In some instances, for example, when sheets of poly(ethylene terephthalate), are used, it may be advantageous to supply an intermediate layer, e.g., based on vinylidene chloride copolymers or saturated polyesters, in order to improve the adherence of the magnetic layer for the support. The thickness of the base film is typically about 3 to 100 µm, preferably to 5 to 50 µm.

The non-magnetic support may be coated on one or both sides and when coated on one side only, the non-coated (near) side of the support may be coated with a binder material containing carbon black or other static reducing non-magnetic pigments. Once coated, the magnetizable particles may be subjected to one or more after-treatments, such as magnetic orientation, prior to drying the coating. Once dry, the coated layer may be subjected to further treatments, such as calendering to compact the binder and smooth its surface, burnishing and/or buffing and ageing to remove residual solvent not removed in the drying process, before cutting into the desired shape and size.

The solvent content of the coating mix is evaporated during the drying stage, typically by passage through an oven, infrared heater, microwave oven, and the like. The actual choice of coating solvent is largely governed by the particular solubility characteristics of the chosen copolymer, but it should not be reactive with any other component of the medium. Preferred solvents are toluene, cyclohexanone, tetrahydrofuran, methyl ethyl ketone and mixtures thereof.

The magnetic media of the invention are suitable for the preparation of magnetic recording elements such as cards, data cartridges, discs, diskettes, drums and tape for audio, video, instrumentation and computer uses.

The magnetizable particles may comprise any of the magnetizable materials known in the art but are typically finely divided magnetic particles including particles of magnetic oxides such as gamma hematite ($\gamma$-$Fe_2O_3$), magnetite ($Fe_3O_4$), mixed crystals of ($\gamma$-$Fe_2O_3$), and ($Fe_3O_4$), Co-doped $Fe_2O_3$, Co-doped $Fe_3O_4$, Co-doped mixed crystals of $Fe_2O_3$ and Fe$_3$O$_4$, barium hexa-ferrite, Berthollide compounds; various kinds of acicular magnetic alloy powders, such as Fe, Fe—Co, Co—Ni, Fe—Co—Ni, Co—Cr, CrO$_2$, Fe—Co—B, Fe—Co—Cr—B, Fe—Co—V, Mn—Bi, Mn—Al etc.; nitrides of Fe, Fe—Co, Fe—CS—Ni, fine iron etc., and mixtures of two or more of the above.

The invention is hereinafter described in more detail by way of example only.

EXAMPLE 1

Synthesis of star block containing "dispersing monomer".

(i) Material preparation.

Isoprene and styrene were purified by washing the required amount down a silica gel column with cyclohexane under an argon atmosphere prior to use; the silica gel had been dried at 150° C. before use.

The monomer, 4-dimethylamino styrene was prepared according to the method of Y. Morishina et al, J. Polymer Science, 1982, 20, 299–310; the required amount was purified prior to use by washing the chemical down a column of basic alumina (Brockman grade, dried at 150° C.) with cyclohexane under argon.

The coupling agent, divinyl benzene (50–55%) was purified prior to use by passing it down a column of dried silica with a small amount of dried basic alumina placed at the head of the column. Silica and alumina materials were dried as described above.

The molarity of the sec-butyl lithium used, nominally 1.3M in cyclohexane, was checked by titration according to the method of M.R. Winkle et al, Chem. Comm., 1980, 87. Preparation of a Star Block Copolymer Containing Five 4-dimethylamino styrene groups/arm.

A dry 2l flask equipped with a septum, thermometer, stirrer, water condenser and an argon inlet, containing 680 ml of cyclohexane and 0.5 g of styrene was heated to about 50° C. under argon. A small amount of sec-butyl lithium was added by syringe until a yellow colour formed. The temperature was increased so that all surfaces of the flask and condenser were wet; this process continued for approximately 1 hour. If during this time the yellow colour discharged, a further amount of sec-butyl lithium was added. The contents of the flask were allowed to cool to about 40° C., and the yellow colour was just discharged by adding anhydrous methanol using a microsyringe; typically about 10–50 micro liters of methanol was required.

During the cooling down time, styrene (118.9 g) was purified by passing it down a silica gel column with cyclohexane (450 ml). Cyclohexane (100 ml) was used to pre-wet the silica column and cyclohexane (300 ml) was used to wash out the styrene. Monomer, 4-dimethylamino styrene (2.19 g) was washed down a basic alumina column with cyclohexane (40 ml). This solution was added to the flask containing the styrene charge under argon. This solution containing both styrene monomers was transferred under argon to the 2l polymerisation vessel by cannula. The contents of the polymerisation vessel were at a temperature of 34° C.

The slowly stirred polymerisation mixture was titrated with 1.3M sec-butyl lithium by syringe until a slight yellow colour developed, whereupon a 2.4 ml charge of sec-butyl lithium was added immediately from another syringe. The temperature of the polymerisation mixture increased from 34° C. to 44° C., over a ten minute period, and cooling with a water bath was necessary to stop the temperature increasing further. The temperature was maintained at between 40°–43° C. for a further 50 minutes using a combination of heating and cooling when necessary. During this time the reaction mixture took on an orange coloration. A sample of the styrene block was taken by syringe, quenched with ethanol, and sent for GPC analysis.

While the styrene polymerisation reaction was occurring, isoprene (64.6 g) was purified by passing it down a silica column with cyclohexane (150 ml) after an initial pre-wet with cyclohexane (50 ml). Diphenylacetic acid (0.03 g) dissolved in a few drops of anhydrous tetrahydrofuran (THF) was added to the stirred isoprene solution. The solution was titrated with sec-butyl lithium (ca. 0.4 ml) to a lime green end point. The isoprene solution was transferred to the polymerisation flask by cannula under argon, resulting in the temperature decreasing to 39° C. with the polymerisation mixture changing colour from orange to yellow.

After a few minutes the exothermic polymerisation of isoprene raised the temperature of the mixture to 46° C. The temperature was maintained at between 42°–46° C. until the polymerisation of isoprene had gone to completion (ca. 90 minutes). A sample of the styrene-isoprene block was taken from GPC analysis.

The star synthesis was completed by adding coupling agent divinyl benzene (purified, 4 ml (50%)) by syringe, resulting in the formation of a reddish coloured polymerisation mixture, which was maintained at 55° C. overnight.

The polymer was isolated by precipitation into methanol and drying it under vacuum at 60° C. GPC data from the above synthesis is presented in Table 1.

TABLE 1

|  | Molecular Weight | Polydispersity |
| --- | --- | --- |
| Styrene Block | 36,380 | Mw/Mn = 1.16 |
| Styrene/Isoprene Arm | 62,312 | Mw/Mn = 1.18 |
| Star | 461,874 | Mw/Mn = 1.26 |

Arms per star = ca. 7.4; % of uncoupled star = 15%; % Styrene content = 58%

Quaternisation Of Star Block

The precipitated star block copolymer described above (171 g) was dissolved in toluene (400 ml) with stirring and heated at 60° C. under argon. Dimethylsulphate (1.9 g) was added to the dissolved polymer which was maintained at 60° C. overnight. The polymer was isolated by precipitating in methanol and drying under vacuum at 60° C.

The extent of quaternisation of the dimethylamino groups was determined by $^1$H nmr at high sensitivity. GPC analysis of the quaternised star is not possible as the polymer adheres to the column and is therefore not efficiently eluted.

EXAMPLE 2

Another two star block copolymers B and C were synthesised using the above method. Each polymer contained approximately five dispersing monomer units per arm. Each polymer was also quaternised with dimethyl sulphate.

Additional star block copolymers were prepared using the method described in example 1 but using different monomer 4-dimethylamino styrene concentrations. Polymer D contained 1.095 g of this styrene monomer, resulting in a star block copolymer containing 2.5 4-dimethylamino styrene monomer units per arm. Polymer E contained 4.38 g of 4-dimethylamino styrene, which corresponds to 10 dispersing units per arm. Star block data and assigned polymer codes are presented in Table 2.

TABLE 2

| Code | Dispersing Groups Per Arm | Molecular Weights ×10⁻³ | | | No. of Arms |
|---|---|---|---|---|---|
| | | Styrene | Arm | Star | |
| A | Five | 36 | 62 | 462 | 7.4 |
| B | Five | 37 | 62 | 370 | 5.9 |
| C | Five | 40 | 73 | 489 | 6.6 |
| D | Two and a half | 37 | 61 | 487 | 7.9 |
| E | Ten | 37 | 62 | 357 | 5.8 |
| F | NONE | 41 | 64 | 441 | 6.9 |
| F2 | NONE | 32 | 49 | 360 | 7.3 |

The above polymers were utilised as magnetic media binders in various examples.

EXAMPLE 3

Polymers A, D and E were evaluated as magnetic media binder materials with BaFe pigment (Toda sigma T 50125; surface area=50m²/g).

A magnetic dispersion containing 35% solids and 75% pigment as a percentage of the total solids was constructed as follows. Barium hexa-ferrite pigment (Toda Sigma T 50125) (150 g) were added portion wise to a stirred solution (Dispermat CV dissolver) of the polymer A(47 g), oleic acid (3 g), MEK (223 g), toluene (74 g) and cyclohexanone (74 g). After three hours, the premix was then transferred to the hopper of a Dispermat SL603 horizontal bead mill, and milled with zirconia media until smooth (constant gloss).

After the milling process was completed, hand spread coatings were taken using a knife coater, and pulling said coating through a pair of magnets (5000 Gauss) to align the magnetic pigment.

The bulk magnetic properties together with high shear viscosity and coating gloss data are presented in Table 3. Polymers D and E, were milled in an identical fashion to polymer A.

For comparison with star block copolymers containing dispersing functionality, two star block copolymers, Polymers F and F2, were evaluated under the same milling conditions. Polymers F/F2, which do not contain any dispersing functionality, are the subject of WO93/01592. As these binders do not contain any dispersing functionality, addition of a suitable wetting agent was required to induce, and maintain the dispersing process. WO93/01592 described the use of an oligomeric dispersing agent, Hypermer MT-1 (ICI), in conjunction with star block copolymers, which incudes polymers F/F2. Using the formulation disclosed in WO93/01592, 5 weight % of Hypermer MT-1 based on pigment weight, was added to the dispersion during the pre-mix stage.

In order to demonstrate the effectiveness of chemically bound dispersing functionality to the star block copolymer, a separate comparison was made with polymer F. In this experiment, code F2, the above formulation was milled without any addition of Hypermer MT-1. This forms a good comparison to dispersions containing A, D and E, as they contained no additional dispersing agents.

The pigment utilised for this comparison was the same barium hexa-ferrite (BaFe) pigment which had been formulated with polymers A, D and E, (Table 3.).

TABLE 3

| | Gloss | ICI | Hc | Squareness |
|---|---|---|---|---|
| Polymer A (Invention) | 92 | 40 | 1396 | 0.73 |
| Polymer D (Invention) | 98 | 34 | 1366 | 0.66 |
| Polymer E (Invention) | 92 | 22 | 1388 | 0.72 |
| Polymer F (Comparison) | 15 | 55 | 1338 | 0.62 |
| Polymer F2 (Comparison) | 3 | 34 | 1405 | 0.66 |

The data presented in Table 3 indicates that the star block copolymers (A, D and E) with internal dispersing chemistry yield good magnetic dispersions, as indicated by extremely high gloss data from hand drawn coatings. In addition, polymers A and E yielded higher magnetic squareness values compared to polymer D. This suggests that the inclusion of five dispersing monomer units per star arm offers improved dispersing performance over 2.5 groups per arm (polymer D).

Both comparative dispersions yield coatings with very poor surface gloss, a good indicator of poor dispersion quality. This data, and the lower squareness values obtained, compared to coatings from dispersions containing dispersing polymers A and E, strongly suggests that even the addition of a lower molecular weight dispersing agent to non-dispersing star block copolymers, cannot yield good dispersion quality with high surface area pigments such as BaFe (50 m²/g).

EXAMPLE 4

Polymers A, B and C were further evaluated with different pigments. Pigments utilised were ISK9966s, BaFe (Toda sigma T 50125) and MP (Toda BII). Dispersions containing 35% solids of which the pigment was 75% of the total, were prepared and milled as described in Example 3. The dispersion data together with bulk magnetic properties were presented in Table 4.

TABLE 4

Dispersion Quality with Different Pigments

| | Pigment Type | Gloss | ICI | Hc | Squareness |
|---|---|---|---|---|---|
| Polymer A | BaFe | 92 | 40 | 1396 | 0.73 |
| Polymer B | BaFe | 88 | 34 | 1408 | 0.74 |
| Polymer A | MP | 88 | 45 | 1546 | 0.82 |
| Polymer C | MP | 83 | 49 | 1541 | 0.81 |
| Polymer C | ISK | 77 | 49 | 920 | 0.81 |

The data presented in Table 4 indicates that star block copolymers containing the aforementioned dispersing chemistry can be used as a self-dispersing binder for a range of magnetic pigments. In each case, hand spread coatings yielded gloss and bulk magnetic data indicative of good quality dispersions.

EXAMPLE 5

All of the dispersions milled in Example 4 were further evaluated for dispersion stability. The data presented in Table 5, indicates how each measured parameter has changed after the dispersion had been left to stand for at least 14 days. Prior to handspread coating the aged dispersion, the material was hand stirred for two minutes using a glass rod stirrer.

TABLE 5

Dispersion Stability Data

| Pig-ment | Gloss t = 0 | Gloss aged | ICI t = 0 | ICI aged | Hc t = 0 | Hc aged | Squareness t = 0 | Squareness aged |
|---|---|---|---|---|---|---|---|---|
| Polymer B | BaFe | 88 | 94 | 34 | 34 | 1408 | 1400 | 0.74 | 0.74 |
| Polymer A | MP | 88 | 91 | 45 | 45 | 1546 | 1521 | 0.82 | 0.79 |
| Polymer C | MP | 83 | 75 | 49 | 46 | 1541 | 1523 | 0.81 | 0.78 |
| Polymer C | ISK | 77 | 70 | 49 | 48 | 920 | 917 | 0.81 | 0.77 |

The "aged" figures represent measured values from dispersions aged for >14 days. Figures in columns headed by t=0 are values obtained from dispersions after milling to constant gloss.

The data presented in Table 5 indicates that the self-dispersing star block copolymers described in this invention afford good dispersion stability to formulations containing a range of different magnetic pigments. A good yardstick for dispersion stability is to examine the high shear viscosity (ICI) of the dispersions over a period of several days. Comparing data collected immediately after milling to that obtained from aged dispersions (+14 days), clearly shows that the high shear viscosity does not deteriorate on aging, which implies that good dispersion quality is retained. This is confirmed by good gloss and bulk magnetic data obtained from said formulations after 14 days storage.

We claim:

1. A magnetic recording medium comprising a magnetizable coating provided on a substrate wherein the magnetizable coating comprises a magnetic pigment dispersed in a polymeric binder, said polymeric binder comprises a star block copolymer having a two phase morphology and comprising pendant dispersing groups, wherein said star block copolymer has the general formula:

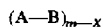

in which;

X represents a polyfunctional coupling moiety;

each (A–B) represents a polymeric arm radiating from the polyfunctional coupling moiety X, m has a number average value of at least 3

A represents a hard glassy polymeric segment having a $Tg \geq 75°$ C., and

B represents a soft rubbery polymeric segment having a $Tg \geq 25°$ C., which hard glassy polymeric segment is incompatible with the soft, rubbery polymeric segment and;

each arm (A–B) comprises one or more hard glassy segments and one or more soft, rubbery polymeric segments with the proviso that the hard, glassy polymeric segments comprise at least 50% of the total weight of the star block copolymer and the free ends of the arms (A–B) comprise a hard glassy polymeric segment, said dispersing group (s) being pendant to said hard polymeric segment, and wherein there are an average of from two to ten dispersing groups per polymeric arm.

2. A magnetic recording medium according to claim 1 wherein the hard glassy polymeric segment comprises a homopolymer of a monovinyl aromatic polymer.

3. A magnetic recording medium according to claim 2 wherein the monovinyl aromatic monomer is styrene.

4. A magnetic recording medium according to claim 1 wherein the soft rubbery polymeric segment comprises a homopolymer of a conjugated diene.

5. A magnetic recording medium according to claim 4 in which the conjugated diene is a member selected from the group consisting of isoprene and butadiene.

6. A magnetic recording medium according to claim 1 wherein m has a number average value in the range 4 to 10.

7. A magnetic recording medium according to claim 6 wherein m has a number average value in the range 5 to 8.

8. A magnetic recording medium according to claim 1 wherein the coupling agent X is derived from divinyl benzene.

9. A magnetic recording medium according to claim 1 wherein said hard polymeric segment is polystyrene and said soft polymeric segment is a member selected from the group consisting of polyisoprene and polybutadiene and said dispersing group is pendant to said polystyrene segment.

10. A magnetic recording medium according to claim 1 wherein said dispersing group is a member selected from the group consisting of sulphonic, phosphoric, phosphonic and carboxylic acids and salts thereof, phosphonate esters, tertiary amines and quaternary ammonium salts.

11. A magnetic recording medium according to claim 10 wherein the dispersing group is a quaternary ammonium salt.

12. A magnetic recording medium according to claim 1 also having dispersing groups pendant to said one or more soft polymeric segments.

* * * * *